Sept. 20, 1971        C. J. HELTZEL        3,605,579
ANTI-SKID SURFACE TEXTURING AND GROOVE FORMING EQUIPMENT
FOR USE IN CONCRETE ROADS
Filed Dec. 11, 1968                          6 Sheets-Sheet 1
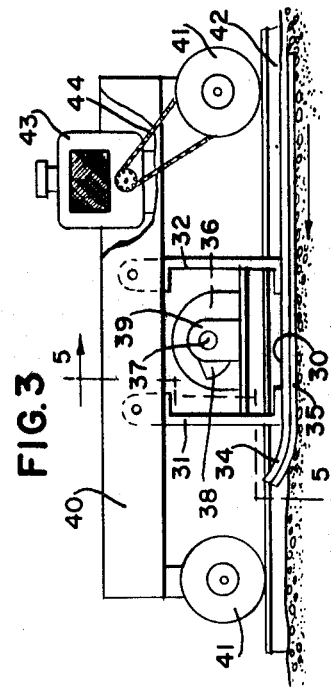
FIG.3
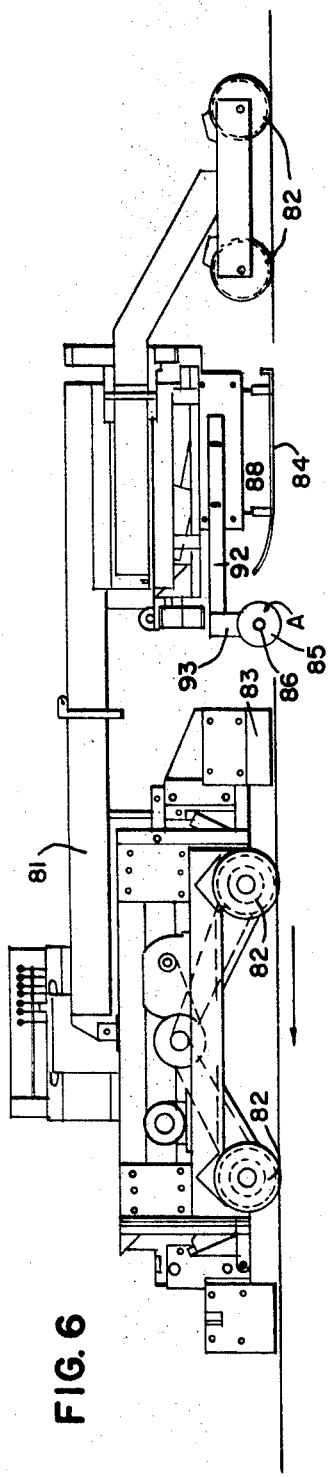
FIG.6
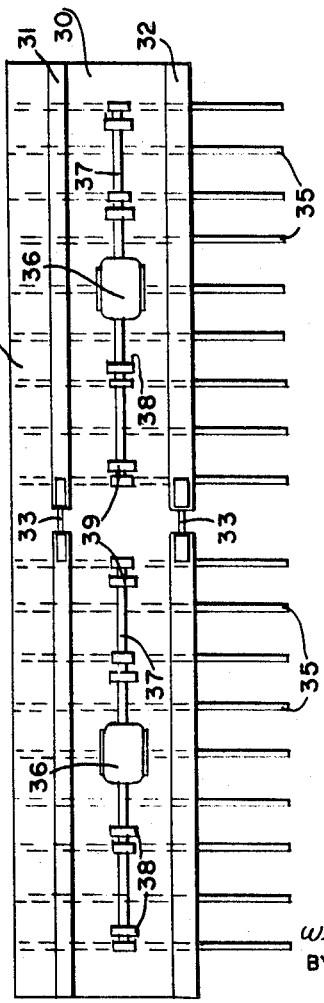
FIG.4
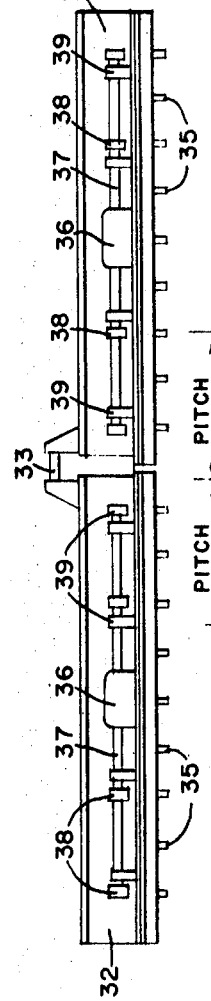
FIG.5
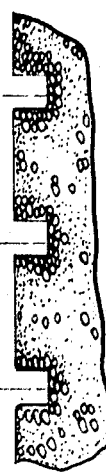
FIG.1 BROOMED SURFACE
FIG.2 GROOVED SURFACE
INVENTOR
CARL J. HELTZEL
BY Wilkinson, Mawhinney and Thiebault
ATTORNEYS

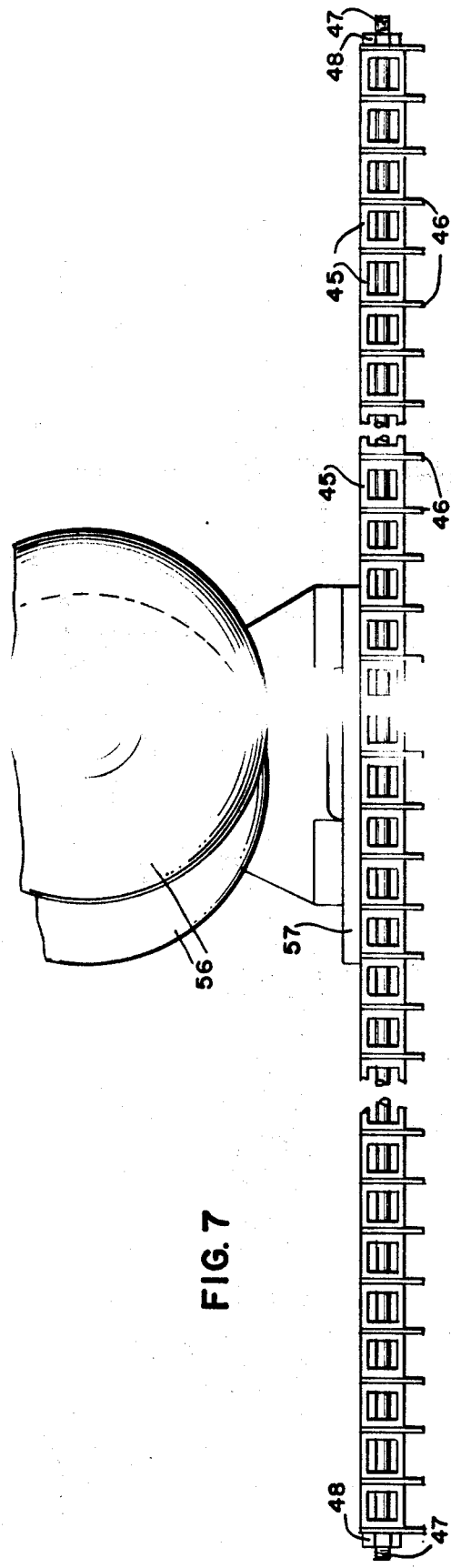
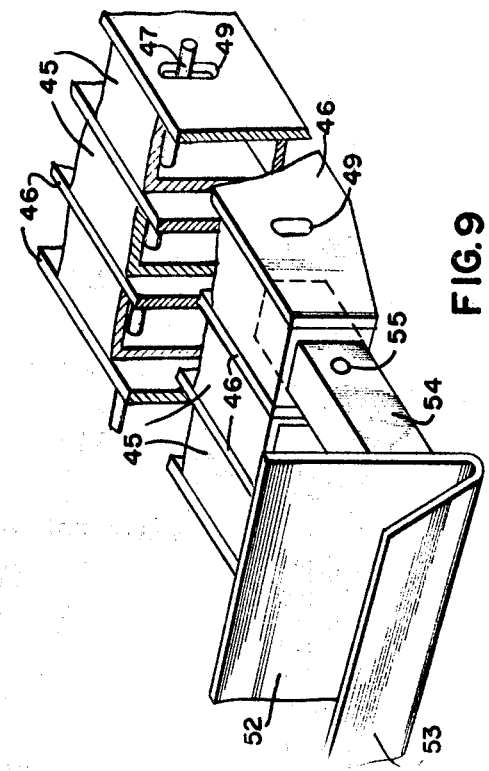
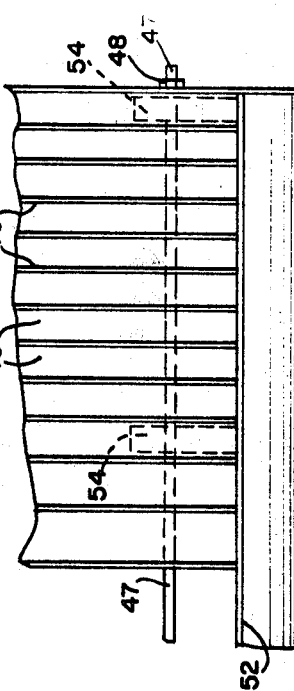

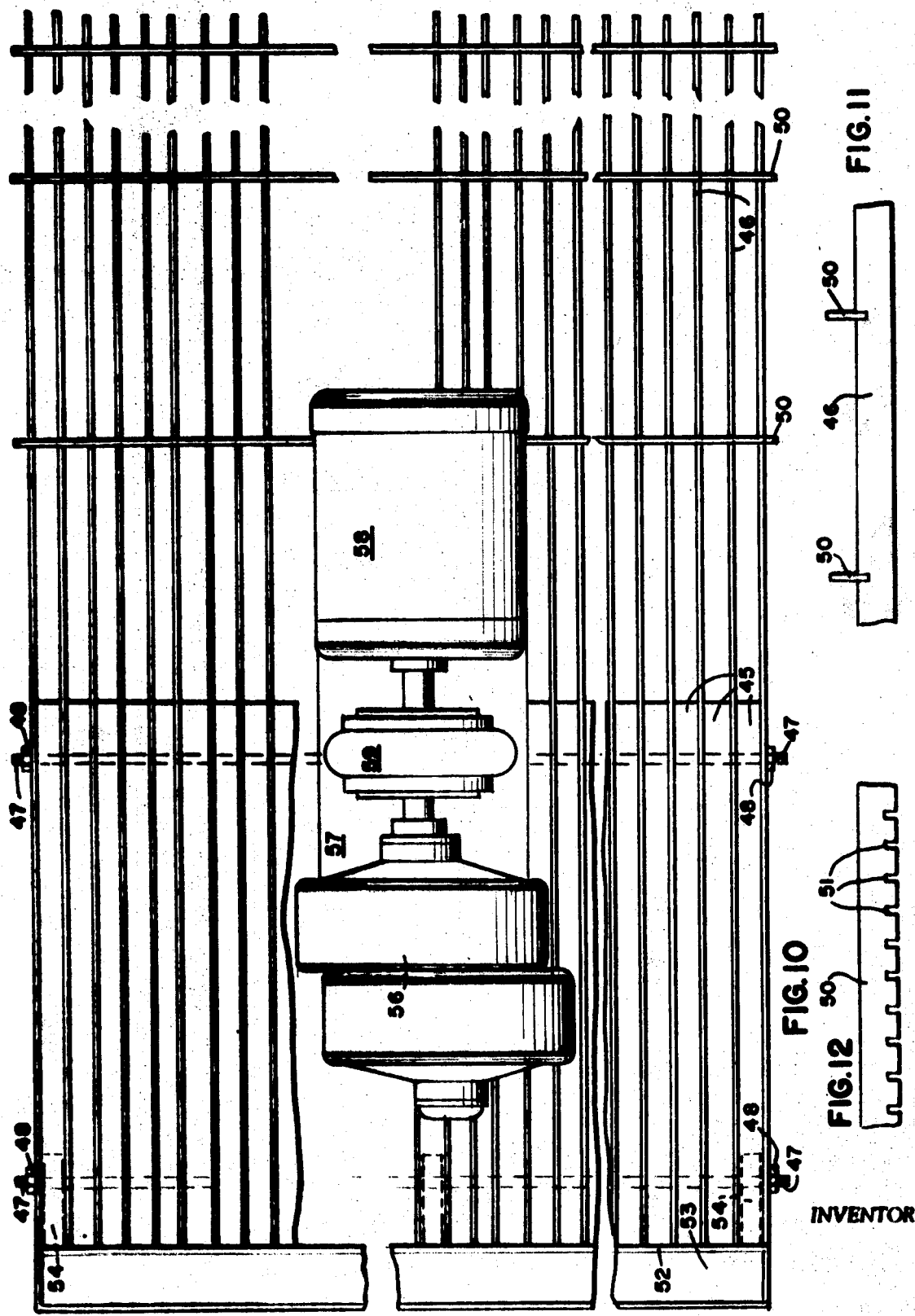

INVENTOR
CARL J. HELTZEL
BY Wilkinson, Mawhinney and Thiebault
ATTORNEYS

Sept. 20, 1971  C. J. HELTZEL  3,605,579
ANTI-SKID SURFACE TEXTURING AND GROOVE FORMING EQUIPMENT
FOR USE IN CONCRETE ROADS
Filed Dec. 11, 1968  6 Sheets-Sheet 6
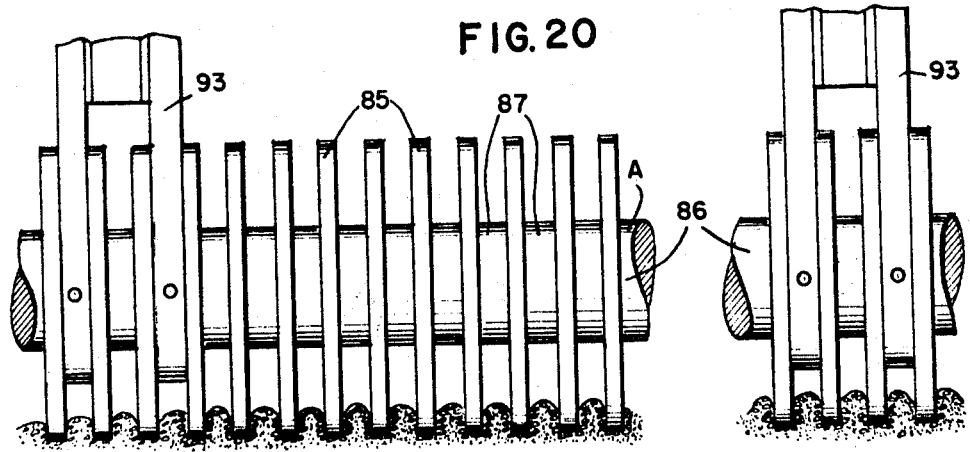
FIG. 20
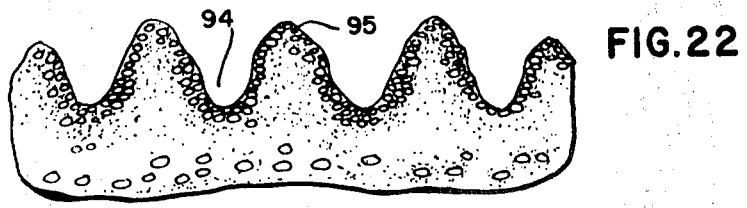
FIG. 22
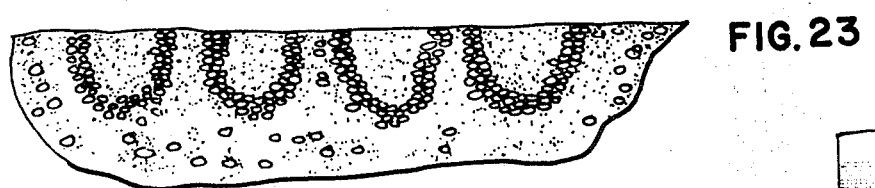
FIG. 23
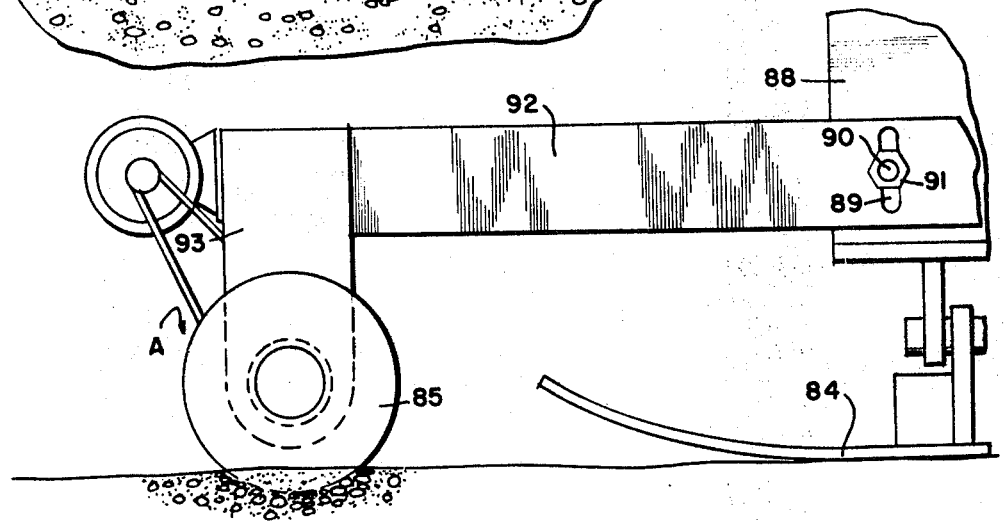
FIG. 19
FIG. 21
INVENTOR
CARL J. HELTZEL
Wilkinson, Mawhinney and Thiebault
BY
ATTORNEYS United States Patent Office 3,605,579
Patented Sept. 20, 1971

3,605,579
ANTI-SKID SURFACE TEXTURING AND GROOVE FORMING EQUIPMENT FOR USE IN CONCRETE ROADS
Carl J. Heltzel, 523 Country Club Drive, Warren, Ohio 44484
Filed Dec. 11, 1968, Ser. No. 782,898
Int. Cl. E01c 19/43
U.S. Cl. 94—45                                     8 Claims

ABSTRACT OF THE DISCLOSURE

Laterally spaced freely-rotating or powered discs on a concrete road making machine displace the stones in the concrete mix from linear areas in the slab where non-skid grooves are to be subsequently formed while the concrete is still in a plastic state by the tines of a drag or float or the tines of a rotary brush, which drag, float or brush are carried on an independent vehicle following the conventional concrete road machine, which vehicle may have supporting wheels running on side forms or have caterpillar endless tracks in the case of formless pavers.

---

The present invention relates to anti-skid surface texturing and groove forming equipment and process for texturing and forming anti-skid grooves in concrete roads, airplane runways and the like.

In recent years considerable study has involved anti-skid applications to both concrete and asphalt pavements and air port runways.

On relatively smooth surfaces, studies have indicated that automobile and aircraft tires at high speeds on wet surfaces actually plane over the surface and do not make physical contact with the surface of the slab but are insulated by a very fine film of water.

Tests have been made producing longitudinal grooves which have been sawed into the surface of concrete slabs after they have hardened and set. In those tests it was necessary to use friction saws with diamond or hard surface cutters to cut these grooves, making the operation expensive.

Another proposal has been to rotate a diamond-impregnated cylinder against the surface of a finished concrete road which was found to impart an irregular grooved surface. This was also proved to be expensive.

These grooves have been cut in the slab surface in varying sizes, and it has been shown that they tend to keep vehicles running or holding to the direction of the grooves in the slab surface. It has been demonstrated that the rubber of the tires actually moves down into the grooves.

It has also been proposed to operate brooms transversely of a roadway to texture and roughen the surface which assists vehicles to brake and slow their speeds and at the same time reduce skidding. Transverse brooming by mechanical means was used about twenty years ago. When we introduced mechanical transverse brooming years ago, the purpose was to texture or roughen the surface. The direction of the broom was at a right angle to the slab so that with the forward motion of the machine the resultant grooves were at a slight angle to the slab. By skewing the direction of the broom and correlating the transverse speed of the broom to the forward speed of the machine, the resultant grooves are at right angle to the slab.

Longitudinal roughing-up of the surfaces of fresh slabs has also been experimented with by dragging burlap or other heavy textured fabric across the surfaces of roadways on freshly poured concrete. The main objection to this practice is that the materials fill with grout and moisture within a short time and proportionately lose their effectiveness.

An object of the present invention is to utilize brooming and/or grooving of surfaces of concrete roads by treating the freshly poured slabs which lends itself more readily and inexpensively to such treatments as compared with the attempted production of anti-skid surfaces in completed hard concrete or other roads.

Another object of the invention is to provide a method by which longitudinal grooves may be formed in concrete roads and airplane runways just prior to final setting of the plastic concrete whereby the grooves will retain in the set concrete slabs the predesigned form ordained for same.

A further object of the invention is to provide a method and apparatus by which longitudinal grooves, having sharp corners, may be formed in concrete roads and runways as an effective preventative from vehicle lateral skidding.

A still further object of the invention is to provide novel method and apparatus for brooming or roughing the surfaces of plastic roads and runways under construction for avoiding skidding, assisting braking and contributing to the general stability of the vehicle while in motion.

A still further object of the invention is to achieve the foregoing results simply and effectively as a contribution to safety and improved stability of road vehicles and airplanes while traveling on highways and runways.

With the foregoing and other objects in view, the invention will be more fully described hereinafter, and will be more particularly pointed out in the claims appended hereto.

In the drawings, where like symbols refer to like or corresponding parts throughout the several views:

FIG. 1 is a vertical fragmentary sectional view of a pavement or concrete slab having a broomed surface;

FIG. 2 is a similar view illustrating a grooved surface;

FIG. 3 is a side elevational view of a form of grooving device according to the invention;

FIG. 4 is a top plan view of the grooving device;

FIG. 5 is a vertical sectional view of the grooving device taken on the line 5—5 in FIG. 3;

FIG. 6 is a side elevational view of a form of concrete road finishing machine modified to illustrate a form and suggested location of a stone depressor according to the invention;

FIG. 7 is a front elevational view with the front member removed of a modified form of grooving device;

FIG. 8 is a fragmentary top plan view of the same with the front member in place;

FIG. 9 is a fragmentary perspective exploded view of the modified device;

FIG. 10 is a top plan view of the same with parts broken away;

FIG. 11 is a fragmentary side elevational view of a grooving tine and spacer bars;

FIG. 12 is a front elevational view of a spacer bar showing the kerfs or slots for interfitting with the grooving tines;

FIG. 19 is a fragmentary side elevation on an enlarged scale of the stone depressor and float pan;

FIG. 20 is a fragmentary front elevation of the stone depressor;

FIG. 21 is a vertical fragmentary section through the slab showing the concrete section after final screeding but before the action of the stone depressor;

FIG. 22 is a fragmentary vertical cross sectional view through the concrete slab showing the displacement of the stone content of the concrete mix by the stone depressor from the linear area of the slab where the non-skid grooves are to be formed;

FIG. 23 is a similar cross section through the slab showing the consequent replacement of the grout into the groove areas by the float pan following passage of the stone depressor.

Figure 15:
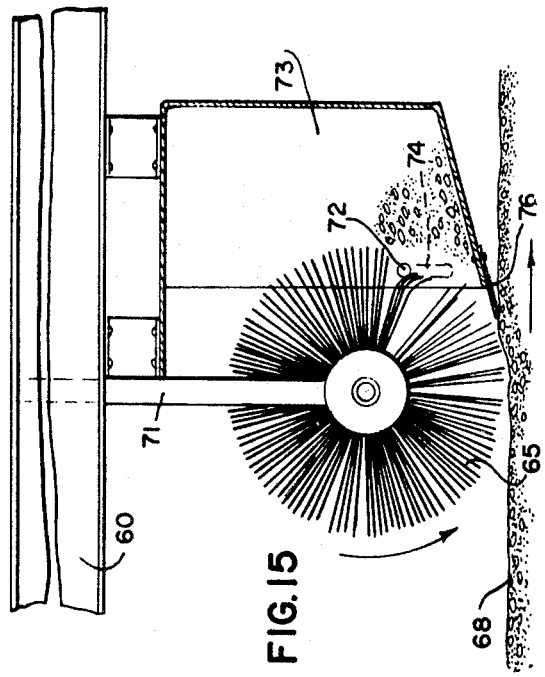
FIG. 15 is a vertical sectional view taken on an enlarged scale through the longitudinal grooving broom.

Referring more particularly to the drawings, FIG. 1 illustrates a broomed surface in which the fine grooves run longitudinally of the slab or road surface. FIG. 2 shows a slab having substantially square more substantially defined grooves running longitudinally of the highway or runway. A machine for forming these grooves is illustrated in FIGS. 3, 4 and 5, in which 30 indicates a float pan, stiffened by spaced upright transverse channel-shaped members 31 and 32. As appears in FIGS. 3 and 4, these stiffener members or beams 31 and 32 are divided at the longitudinal center line of the pan 30 and slab where the adjacent ends of the members 31 and 32 are fitted with crown setting devices 33.

The leading edge 34 of the pan 30 is turned up to plane over the freshly poured slab. To the bottom of the pan 30, solid bars or tines 35 are spot welded or otherwise secured at a proper or desired pitch or spacing, the bars being of the required cross section to form grooves of the form shown in FIG. 2. The pan 30 and bars 35 will be vibrated by means of electric motors 35 mounted to rotate shafts 37 on which eccentric weights 38 are affixed, the shafts 37 being mounted in bearings 39.

The vibrations are transmitted from the pan 30 through the bars or tines 35 to the plastic concrete tending to consolidate the grout and form the square corners desirable at the edges of the longitudinal grooves for maximum effectiveness in skid control.

Because the pan 30 will be vibrated to form the square edges, it is advisable to extend the grooving bars 35 back beyond the trailing edge of the pan 30. Such construction gives longer contact of the groove forming device to a point of minimum vibrational effect, thus preventing the formed groove from closing up immediately after the passing of the pan 30.

As shown in FIG. 3, this device may be carried on its own frame 40 with wheels 41 riding the forms 42 driven by engine 43 through transmission chain 44; or in the case of slip form paving, instead of wheels, the frame 40 will be carried on endless caterpillar tractor devices riding on the grade outside the slab area; or to a better result, in the case of slip form paving, the frame 40 could properly be attached to the last section of trailing form.

In both slip form paving and in the formation of grooves according to the invention the timing of the cutting of the grooves should be consistent with the initial setting of the concrete slab. In a good slip formed job the concrete must not only be uniform and consistent but it must be delivered at a uniform set pace; thus all the necessary requirements are available in a slip formed job and such is not necessarily required on a slab where side forms are used.

Referring more particularly to FIGS. 7–11 inclusive, a modified form of grooving device is illustrated in which square or other rectangular tubes 45 act as spacers for the groove forming bars or tines 46 and also as a float pan. Transverse tie rods 47 may be employed to hold the bars and tubes together, such tie rods being screw threaded at ends thereof to receive the nuts 48. The tines 46 are substantially longer than the spacer tubes 45, for instance the tubes 45 may be of the order of eighteen inches long while the tines or bars 46 are of the relative order of fifty-four inches long and project rearwardly from the rear ends of the tubes a distance of the order of thirty-six inches to provide for diminution of the effects of the vibration for the purposes heretofore stated. The bars or tines may be one and one-quarter inches wide (vertical dimension) by one-eighth of an inch thick (horizontal dimension). The width of the groove formed in the slab may be ⅛" wide by ⅜" deep. The depth of groove may be adjusted by the provision of slots 49 in the bars or tines 46, so that with little adjustment a groove of any size may be obtained.

The bottom of the tubes 45, which constitutes the float pan surface, will ride at slab elevation. The grooves will be formed by the longitudinal slip forming tines 46 and there is substantial drag of the slip forming tines behind the float pan. This is to insure that the formed grooves remain open and held in place until the entire device has passed over the particular area being grooved. Before this passage the concrete will have at least approached such final set as will avoid slumping of same back into the newly formed grooves.

As shown more particularly in FIGS. 10, 11 and 12, a number of spacer bars 50 are preferably placed at suitable intervals transversely of the tines 46 in the area rearwardly of the rear ends of the rectangular tubes 45 to maintain prescribed spacing and straightness of the tines throughout their length, such lateral spacer bars having kerfs or slots 51 opening downward to fit over and about the tines 46.

Referring to FIGS. 8, 9 and 10, at the front end of the grooving unit is a buffer or screed-like headpiece comprising a substantially vertical plate 52 and a forwardly and upwardly inclining plate 53 which may be in one piece with the vertical plate 52 bent from the lower edge of the plate 52 and at an acute angle to the vertical plane of the plate 52. This headpiece is removably attached to the unit in any desired manner, as by short studs 54 affixed to the rear face of the vertical plate 52 and of a cross-sectional size adapted to fit rather snugly but slidably into the front mouths of the tubes 45. These studs will be perforated with preferably round holes 55 to receive the foremost tie rod 47.

Referring to FIGS. 7 and 10, vibrating shakers 56 are installed on a platform 57 on which a motor 58 is also mounted to drive the shakers or vibrators through a coupling 59, the platform 57 being installed on a forward part of the unit.

Figure 16:
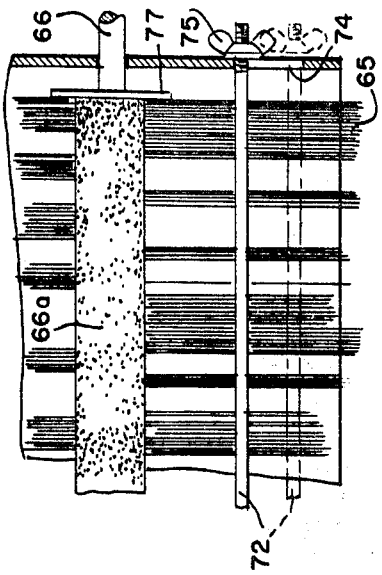
FIG. 16 is a vertical section taken on the line 16—16 of FIG. 15 showing certain adjustments.
Figure 13:
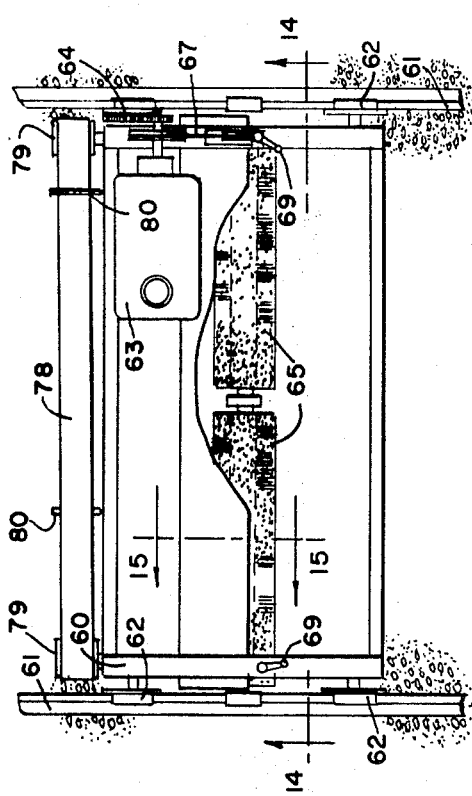
FIG. 13 is a top plan view with parts broken away of a further modified form of grooving device employing brooms for both longitudinal and transverse grooving and brooming.
Figure 14:
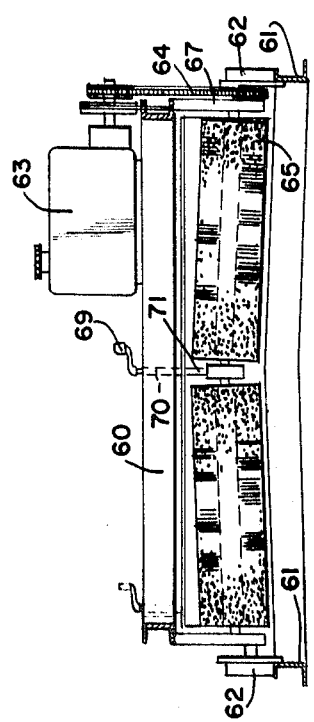
FIG. 14 is a cross sectional view of the same taken on the line 14—14 of FIG. 13.
Figure 17:
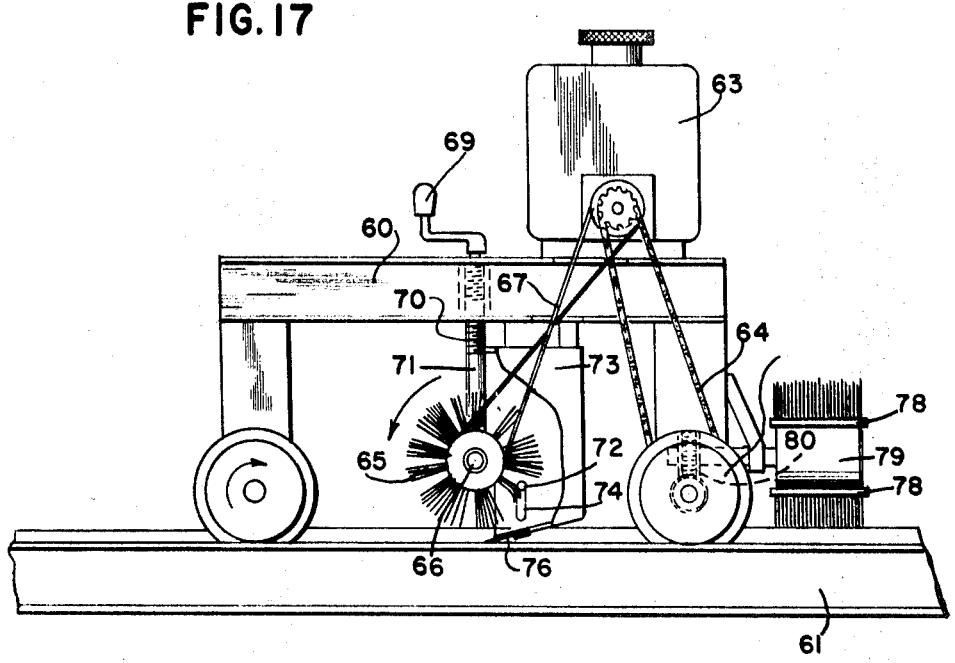
FIG. 17 is a side elevational view on an enlarged scale of the machine shown in FIGS. 13 and 14.
Figure 18:
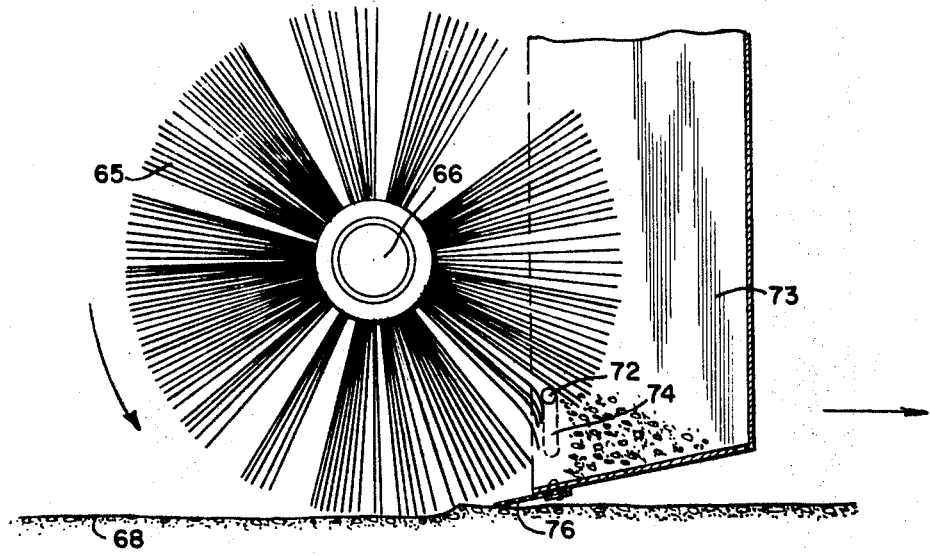
FIG. 18 is a vertical sectional view taken on a further enlarged scale showing the method of forming the longitudinal grooves.

Referring more particularly to FIGS. 13 to 18 inclusive, which show both longitudinal and lateral brooming devices, 60 designates a vehicle which rides the forms 61 by wheels 62 which keep the machine on the forms 61. The machine or vehicle may be driven by a conventional gasoline engine 63 through a power train including endless chain 64 propelling the wheels 62 so that the machine moves forward in the direction of the arrow in FIG. 17. In this same FIG. 17 a rotary broom 65, mounted on a transverse axis 66, is rotated by the engine 63 or other power source through a crossed belt 67 or other transmission device so that the broom 65 rotates in a direction opposite to that of the wheels 62 as shown by the arrows in FIGS. 15, 17 and 18. In other words, the rear half of the broom 65 is descending, as best seen in FIG. 18, so that the resilient bristles or tines thereof dig into the concrete slab to an appropriate depth below the surface thus forming the longitudinal grooves 68 to a variable depth controlled by any suitable device, for instance by a rotary handle or handles 69 operating screws 70 by which the forks 71 in which the broom is cradled for rotation may be elevated or lowered. In this way the groove depths may be altered to suit the conditions peculiar to the particular job being worked.

In order to prevent the broom from filling with concrete and lessening its effectiveness in scarring the top surface of the slab, a bristle cleaner 72 is located so that the brush tines of the broom are bent back and distorted as they come into contact with the cleaner, as illustrated in FIGS. 15, 17 and 18. As the tines pass the bristle cleaner 72, their natural spring rapidly projects them forward into their normal straight radial lines which causes the tines to rapidly propel any concrete particles tending to adhere thereto forward into the receptacle 73. The bristle cleaner 72 may be a rod as shown having a vertical adjustment up and down so that the pressure against the tines of the brush can be varied according to the requirements of the particular job. As shown in FIG. 16, the bristle cleaner 72 is a rod adjustable vertically in the slot 74 having threaded ends for receiving wing nuts 75 to bind the rod against the walls of the receptacle after the appropriate adjustment has been made.

There will be a buildup of concrete particles thrown by the action of the bristles or tines against the bristle cleaner in the receptacle box 73, which will be cleaned out by a hoe or some similar device occasionally as the requirements dictate.

The receptacle 73 is open at its rear end to admit rotation of the broom thereinto and the bottom of the receptacle is shown to be inclined and fitted at its lower free edge with a rubber or other flexible or resilient edge piece 76 also preferably inclined and having its rear free portion positioned to drag on the slab surface with some pressure sufficient to prevent any of the concrete particles picked up by the bristles from being thrown by bristle action under the receptacle 73.

This method of operation will cut the longitudinal grooves by brooming and this same machine may be fitted with a transverse brooming device 77 being an endless conveyor 78 trained over pulleys or rollers 79 mounted at the forward end of the frame or vehicle having brushes 80 thereon, the conveyor 78 being driven by the worm gearing 80.

Referring to FIG. 6, a conventional concrete road building machine 81 is illustrated which operates on the wheels 82 as shown running on the side forms or by endless tracks riding outside the slab area which is also conventional. Between the second or last screed 83 and the following float pan 84, which are standard parts on such machine, is located a stone depressor indicated generally at A, one form of which is illustrated in detail in FIGS. 19 to 23 inclusive.

In FIGS. 19 and 20, the depressor is shown to comprise a series or gang of discs or washers 85. In a successful form the washers were six inches in diameter at one inch spacing or at whatever spacing may be specified for the tines of the groove forming unit. The discs 85 were welded onto the pipe which is the shaft 86 with spacers 87 therebetween, and the shaft 86 is rotatable in bearings fitted in the hangers 93. The mounting will be such that the lower edges of the discs will penetrate the concrete for instance to approximately one-half inch. Because the concrete is plastic at this point little difficulty is experienced in forcing the larger stones down as shown in FIGS. 19 and 22. The float pan 84 that follows will act to fill the depressions with mortar or fines as shown in FIG. 23.

As shown in FIG. 19, the stone depressor may be supported from the float pan support 88 preferably adjustably as shown by the slots 89 and bolts 90 and nuts 91, whereby support arm 92 and bearing hangers 93 for the shaft 86 may be raised and lowered.

It will be understood that this stone depressor is mounted on the road building machine 81 shown in FIG. 6 and that the vehicle 40, shown in FIG. 3, follows at a suitable distance with the groove forming mechanism so that the tines of the latter will not encounter any stones and will arrive at a time when the concrete is about to take its set.

The action of the stone depressor is as follows:

FIG. 21 shows the concrete slab in partial section after the final screeding action but before the action of the depressor. It will be noted that the stones are generally and almost uniformly across the entire section.

FIGS. 19 and 20 show the action of the depressor unit as it pushes its way into the concrete surface into the section, forcing the stones either sidewise or down. Such action displaces concrete in the area occupied by the individual discs or depressors 85 and the surface immediately adjacent tends to heave to some extent as shown in FIG. 22.

FIG. 22 illustrates the surface after the depressing action but before the floating action. Attention is invited to the depressed grooves 94 and the heaved concrete 95 at the edges of the trench. Immediately after passing of the discs or washers 85, the concrete tends to slump back into the trenches or grooves 94 as shown in FIG. 23.

FIG. 23 illustrates the surface after the floating action. The depressed groove areas are now filled and the concrete surface is the same as that shown in FIG. 21 except that at each of the depressed groove areas the float pan 84 has tended to fill the grooves with grout or finer materials than the stones which have been pushed aside or down.

Inasmuch as these washers or depressors are spaced identically as the tines or groove forms little or no difficulty should be experienced in finally forming the antiskid grooves required.

The distance between the grooves at present is considered to be ideally spaced at one inch and the groove-forming tines are spaced apart a distance of the order of one-half to three-quarters of an inch. With such close tolerances it was discovered that stones near the surface of the slab would lodge between the tines and tear up the concrete. While such condition did not occur one hundred percent of the time even one percent of the time cannot be tolerated as no repair work can be done on the slab after the grooves have been formed. The stone depressor will achieve complete correction of this objection.

What is claimed is:
1. An apparatus for making non-skid concrete roads comprising,
 (a) a vehicle movable along a plastic concrete road under construction,
 (b) groove-forming tine bars extending longitudinally of the vehicle and dependent from the vehicle to a position where the tine bars enter the concrete slab while the concrete is in a plastic state and imparts complemental groove formations to the slab opening upwardly through the surface of the slab,
 (c) spacer members between adjacent tine bars,
 (d) said tine bars being substantially longer than the spacer members, creating considerable drag of the groove-forming tine bars behind the float pan insuring that the formed grooves in the slab remain open and held in place until the entire apparatus has passed over any instant area being grooved.

2. An apparatus as claimed in claim 1 further comprising,
 (e) means for affixing the tine bars to the spacer members and for adjusting the height of the tine bars to control depth of grooving in the concrete slab.

3. An apparatus as claimed in claim 1 further comprising,
 (e) means for vibrating the tine bars,
 (f) said vibrating means located adjacent the forward ends of the tine bars whereby the vibration of the tine bars will diminish proportionately toward the rear ends of the tine bars at which rear ends the vibrations will be damped to a low order to cooperate with the rapidly setting concrete at such ends whereby as the rear ends of the tine bars move out from the grooves lately formed the concrete may take its final set and not be disturbed or deformed by slumping behind the departing tine bars.

4. An apparatus for making non-skid concrete roads comprising,
   (a) a vehicle movable along a plastic concrete road under construction,
   (b) groove-forming means dependent from the vehicle to a position where the means enters the concrete slab while the concrete is in a plastic state and imparts complemental groove formations to the slab opening upwardly through the surface of the slab, said groove-forming means comprising,
   (c) a rotary broom mounted in the vehicle to rotate about a transverse axis, said broom having,
   (d) resilient tines longer than the radial distance from the tine roots in the broom to the surface of the concrete slab measured vertically,
   (e) means for rotating the broom in a direction in which the tines in the rear half of the broom are descending toward the still plastic slab whereby the free ends of the tines dig into the plastic concrete and form a textured pattern including longitudinally directed grooves,
   (f) means for adjusting the height of the broom in the vehicle to control the depth of cut of the grooves.

5. An apparatus as claimed in claim 4 comprising,
   (g) means for cleaning the tines of concrete after the tines emerge from the plastic slab,
   (h) an obstacle member disposed in the path of the ascending tines after the tines have risen above the slab adapted to cause the tines to be bent backwards and distorted and to store resilient energy in the tines which becomes kinetic when the tines leave the obstacle member to cause the tines to rapidly and forcibly spring back to normal straight line positions incidentally throwing therefrom any concrete adhering to the tines in a forward direction.

6. An apparatus as claimed in claim 5 further comprising,
   (i) means for adjusting the position of the obstacle member whereby the pressure against the ascending tines may be varied to a desired value.

7. An apparatus as claimed in claim 5 further comprising,
   (j) a receptacle on the vehicle open to the forward end of the rotary broom in position to receive projected particles of concrete from the tines after passing the obstacle member.

8. An apparatus as claimed in claim 7 in which said receptacle includes
   (k) a bottom wall having a transverse rear edge, and
   (l) a resilient edge strip attached to said bottom wall in rearward extension of the latter and on an inclination requiring the free end thereof to drag on the slab surface with pressure to prevent particles of concrete from being propelled by the action of the broom tines beneath the receptacle.

References Cited
UNITED STATES PATENTS

| | | | |
|---|---|---|---|
| 774,005 | 11/1904 | Thies | 94—45UX |
| 1,383,581 | 7/1921 | Stubbs | 94—48 |
| 1,463,979 | 8/1923 | Stubbs | 94—24 |
| 1,683,292 | 9/1928 | Heltzel | 94—45 |
| 2,261,766 | 11/1941 | Jackson | 94—48X |
| 2,354,586 | 7/1944 | Fischer | 94—39 |
| 2,571,876 | 10/1951 | Heltzel | 94—45UX |
| 2,643,595 | 6/1953 | Jackson | 94—48 |
| 2,950,659 | 8/1960 | Smiley | 94—48X |
| 2,975,684 | 3/1961 | Humphrey | 94—45 |
| 3,283,676 | 11/1966 | Sumter | 94—39X |

JACOB L. NACKENOFF, Primary Examiner